Figure 1:
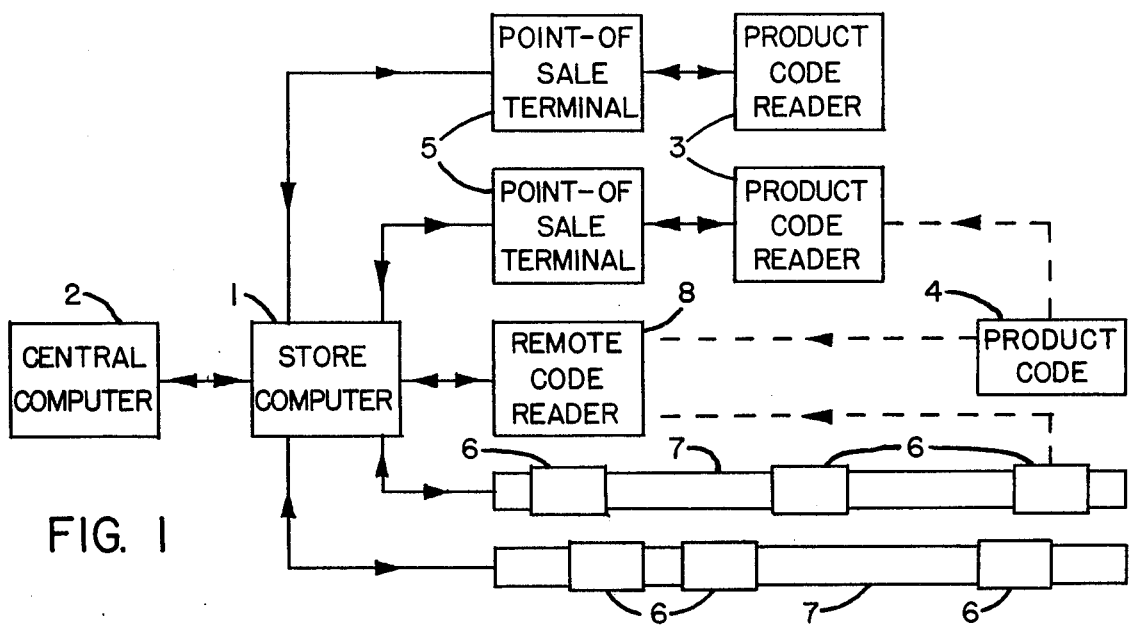

United States Patent [19]

Sundelin

[11] 4,002,886
[45] Jan. 11, 1977

[54] ELECTRONIC PRICE DISPLAY UNIT

[76] Inventor: Ronald Murl Sundelin, 5 Sunset West, Ithaca, N.Y. 14850

[22] Filed: June 20, 1975

[21] Appl. No.: 588,866

[52] U.S. Cl. .............................. 235/61.7 R; 40/5; 214/16.4 A; 340/147 A
[51] Int. Cl.² ..................... G06K 7/14; G09F 3/20; B65G 1/02; H04Q 5/16
[58] Field of Search ................. 214/16.4 A, 91; 40/28.3, 5, 10; 186/1 R, 1 A, 1 B, 1 C, 1 D; 340/152, 147 A, 146.3 SY; 235/61.7 B, 61.11 E, 61.6 R, 61.7 R, 61.11 R, 61.11 D

[56] References Cited
UNITED STATES PATENTS

| 2,924,902 | 2/1960 | Luck | 40/5 |
| 3,159,937 | 12/1964 | Barnes | 40/5 |
| 3,279,108 | 10/1966 | Cappellari | 340/147 A |
| 3,387,269 | 6/1968 | Hernan | 340/152 R |
| 3,679,875 | 7/1972 | Rawson | 235/61.7 R |
| 3,699,312 | 10/1972 | Jones | 235/61.11 E |
| 3,734,311 | 5/1973 | Thompson | 214/16.4 A |
| 3,735,350 | 5/1973 | Lemelson | 340/146.3 SY |
| 3,790,006 | 2/1974 | Hartman | 214/16.4 A |
| 3,876,864 | 4/1975 | Clark | 235/61.7 B |

Primary Examiner—Daryl W. Cook
Assistant Examiner—Robert M. Kilgore

[57] ABSTRACT

This invention pertains to an electronic price display unit which can be remotely addressed and in which the price displayed can be remotely set. Such a device is particularly useful in a retail sales business in a system employing a central computer, point-of-sale terminals, and product code readers, because it ensures that the price displayed for an item is identical to the price actually charged for the item.

12 Claims, 5 Drawing Figures

ELECTRONIC PRICE DISPLAY UNIT

In a retail sales business, the manual entry of prices and other mechandise information into a point-of-sale terminal represents one of the largest operating costs of such a business. In order to reduce these costs, systems employing identifying codes on each item of merchandise and automatic devices for reading these codes have previously been devised. The code, after being read by the automatic reader, enables a computer to enter price and other information from its memory into the point-of-sale terminal automatically, thus greatly reducing the time required for the process.

However, such a system, with the present state of the art, has a major problem associated with it. Prices marked on items of merchandise would no longer be of any utility to a retail sales business, since such prices would be supplied from the memory of a central computer, and said retail sales business could further reduce its operating costs by the omission of marked prices. However, many consumers object to said omission because they would be unable to compare the price actually charged with a marked price. Even if the prices were marked on the items of merchandise, the entry of information into the point-of-sale terminal would proceed so rapidly that the consumer would be unable to compare the prices actually charged with the marked prices until after completion of the transaction Prices printed on labels and displayed adjacent to items of merchandise would present similar problems for consumers. Since a retail sales business would have no use for such information, said business would have little incentive to update such labels when prices were changed, and the consumer would have no guarantee that the price actually charged was equal to the displayed price.

The object of the invention disclosed herein is to guarantee the consumer that the price actually charged for an item of merchandise is identical to the price displayed for the said item, while simultaneously making it unnecessary for a retail sales business to mark prices on individual items or to manually update printed price displasys. The invention accomplishes this objective by employing electronic price displays in which the price displayed is set by the same computer which supplies prices to said point-of-sale terminals. Whenever the price of an item is changed in the computer memory, the price displayed is automatically changed to the same new value.

Although it would, in principle, be possible to connect each price display unit to the computer using separate wires, the number of wires involved and the difficulty of making wiring changes when shelf displays were rearranged make such a method impractical. The invention disclosed herein overcomes this difficulty by incorporating a distinct address code in each display unit such that price information supplied by the computer will not be entered into a particular price display unit unless said computer has addressed that particular unit. By this means, a large number of price display units can be connected in parallel, or effectively in parallel, to the computer using a small number of conductors or other suitable transmission means.

An externally readable code associated with each price display unit permits a correlation to be formed in the memory of said computer between a particular price display unit and the item of merchandise whose price said unit is to display.

Figure 2:
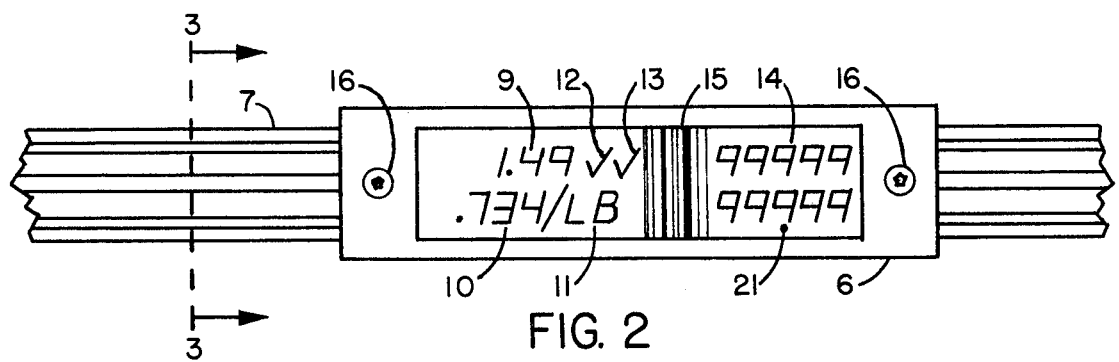
Figure 3:
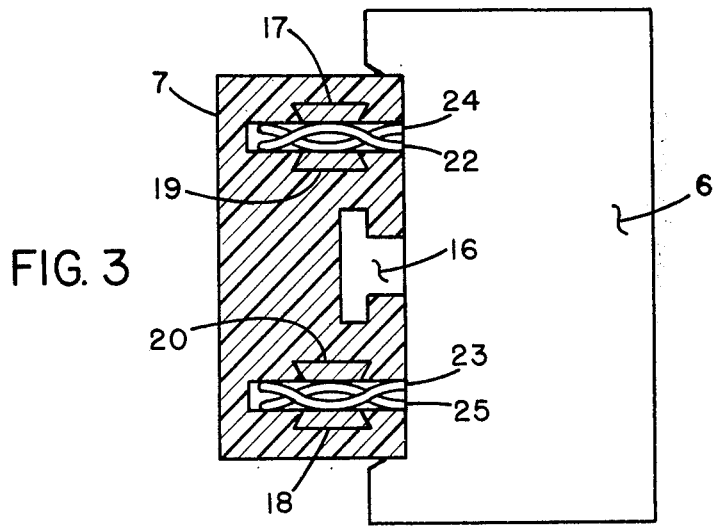
Figure 4:
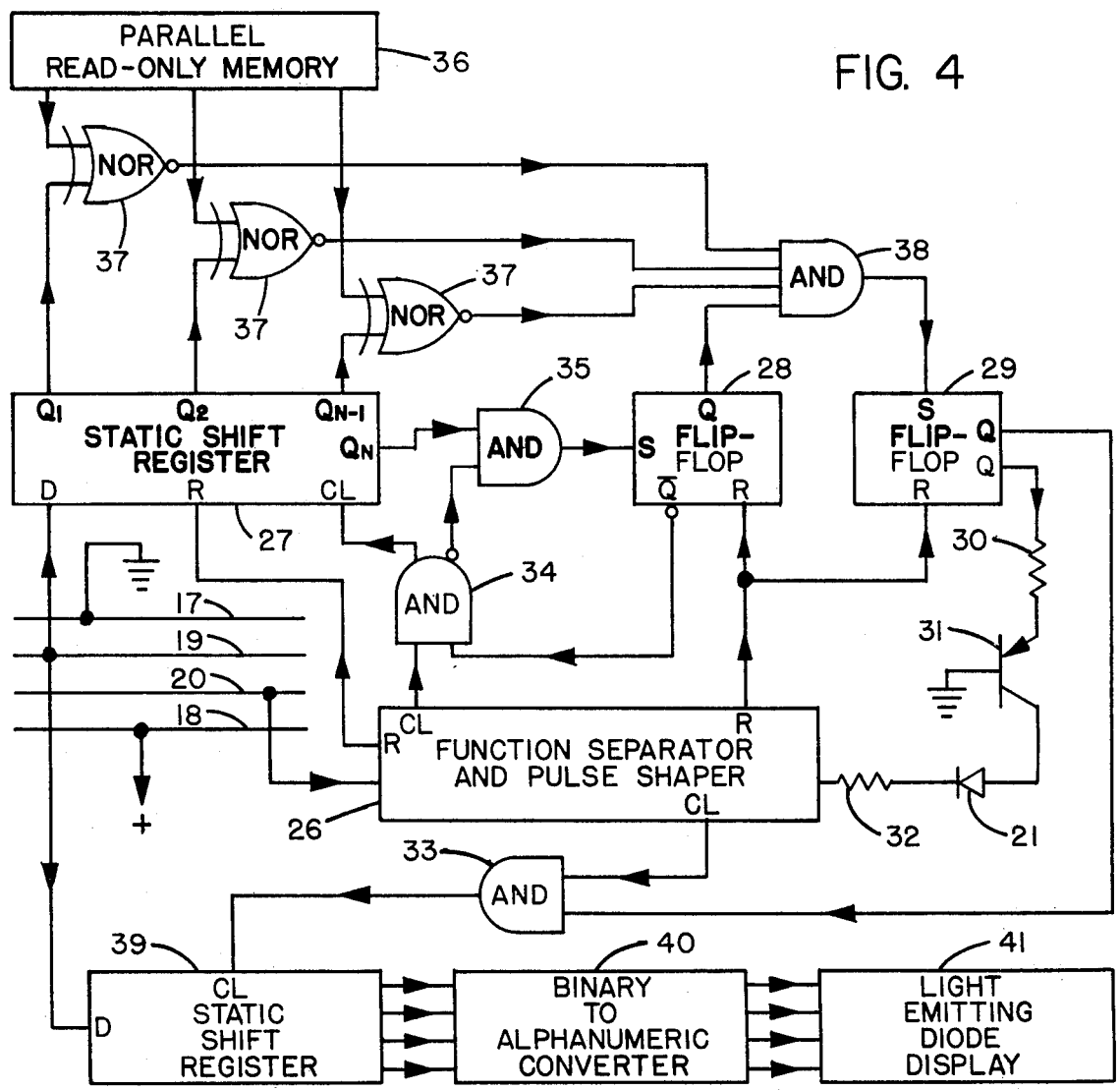
Figure 5:
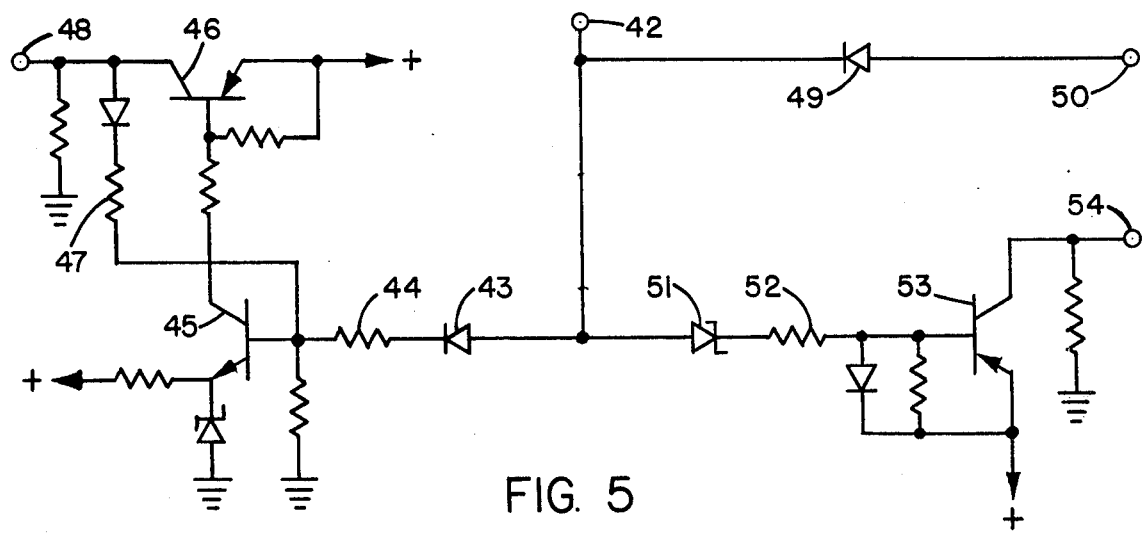

FIG. 1 is a schematic diagram showing the incorporation of electronic price display units in a system in which a computer supplies price information to one or more point-of-sale terminals. FIG. 2 is a pictorial view of an electronic price display unit attached to a shelf bus, and FIG. 3 shows a sectional view of said shelf bus supplying electrical power and electrically coded information to said unit. FIG. 4 is a schematic circuit diagram of an electronic price display unit. FIG. 5 shows circuit details of the function separator and pulse shaper shown in FIG. 4.

With reference to FIG. 1, in which arrows indicate the direction of information flow, prices of items of merchandise for sale by a retail sales business are stored in the memory of a store computer 1. This computer may be linked to a central computer 2 when said retail sales business operates more than one store. The central computer, if existent, could be used to update price and other information. Otherwise, the store computer would be used for this purpose. When an item is being sold, a product code reader 3, of which there may be more than one, is used to read and decode the product code 4 printed on said item. This decoded information is transmitted to an associated point-of-sale terminal 5, which transmits said information to the store computer 1. In response, the store computer transmits the price of said item to the point-of-sale terminal 5, which adds said price to an accumulating total of the prices of all items being sold in a particular transaction. The details of the process described above may be altered by distributing the circuit functions and interconnections differently, without altering the basic process.

One or more electronic price display units 6 is used in conjunction with the store computer 1 as follows. The internal address code of each price display unit is correlated in the store computer memory with the product code of the item or items whose price said price display unit is to display, where said product code is the same product code read by the product code reader 3. Each price display unit 6 is placed adjacent to the display area of the item or items whose price it is to display. Each price display unit is connected to the store computer, from which it receives electrically coded information. The means for connection of said price display unit to said computer may comprise wires or other conductors, electromagnetic transmission and reception, acoustic transmission and reception, or any combination of such means. Connection to said store computer shall be construed to include any interface or interfaces used. In the specific embodiment of the invention chosen for illustration, the electronic price display units 6 are connected to shelf buses 7, which are mounted on the edges of product display shelves. Said shelf buses are, in turn, connected to the store computer 1 by wires.

The correlation in the said store computer memory between the address code of an electronic price display unit and the product code of an associated item or items may be formed by visually reading the externally readable address code of said price display unit and reading said product code and by entering this information into said computer. This process would not have to be repeated until product display areas were rearranged. An alternative means of establishing said correlation in the store computer memory, and the means illustrated herein, involves the use of the remote code reader 8 and an externally readable address code, suitable for reading by the said remote code reader, on the electronic price display unit 6. The remote code reader would be connected to the store computer and would sequentially read address codes of electronic price display units and the associated product codes, and transmit this information into memory in the store computer 1. Such a remote code reader, which operates using photoelectric means, would also be useful for checking inventories.

Once the product codes and display unit address codes have been correlated in the store computer memory, the current price of any item, and other relevant information, can be transmitted by the computer to any price display unit as electrically coded information. The source of displayed price information is thus the same as the source of the price information used by the point-of-sale terminals, thereby ensuring that the displayed price and the price charged are identical.

FIG. 2 shows an electronic price display unit 6, and depicts an electrically displayed price 9, unit price 10, price units 11, symbol indicating an item whose price has temporarily been reduced 12, symbol indicating an item having the lowest unit price of any in its category 13, and the product code 14 of the items or items whose price is being displayed. Display of said product code 14 permits visual confirmation that the price display unit 6 has been correctly correlated in the store computer memory with the adjacent item or items. It is also useful for determining what items should be placed in a particular display area when the stock in that area has been depleted. Electrical means for displaying a price or other information, as used herein, shall be construed to include electrically actuated means, such as electromechanical or electrochemical means, as well as purely electrical or electronic means, such as incandescent, liquid crystal, gas discharge, or light emitting diode displays. An externally readable address code 15 is shown in a form suitable for reading by a remote code reader. Fasteners with non-standard heads 16 are used to attach the price display units 6 to the shelf bus 7.

Although it is possible to construct an electronic price display unit which operates continuously with connection to only two external conductors (using a modulated power supply voltage, electromagnetic wave link, or acoustic link for transmission of coded information to said unit), it appears that connection to four conductors is preferale for reasons of reliability and economy. In FIG. 3, which is a sectional view of FIG. 2, one conductor 17 is the common for the other three, another 18 is a power supply bus, another 19 transmits electrically coded information from the store computer to each price display unit 6, and the last 20 transmits clock and reset pulses to the price display units, and also permits analog readouts to determine the number of price display units responding to a particular address code. Said analog readouts are useful for identifying missing, defective, or redundant price display units. In addition to the analog electrical output, an address light 21 (shown in FIGS. 2 and 4) indicates which units are responding to said address code. Electrical connection of the price display unit 6 to the conductors of the shelf bus 7 is provided by the conductors 22, 23, 24, and 25, which conductors are part of the price display unit 6.

The installation of electronic price display units 6 adjacent to the display area of an item or items whose price is to be displayed is facilitated by use of the fasteners 16, the contacting conductors 22, 23, 24, and 25, the shelf bus 7, the small number of required conductors resulting from use of an internal address code, and a self-contained package of a size and shape compatible with the space commonly available for said installation.

FIG. 4 is a schematic circuit diagram showing one possible mode of execution of an electronic price display unit. In this figure, connection of each active element to the common bus 17 and the power supply bus 18 is understood, but not shown in order to avoid undue complexity. Arrows designate the direction of signal propagation.

A reset pulse, supplied by the store computer, is received on the bus 20, separated by the function separator 26, and used to reset the static shift register 27, and the flip-flops 28 and 29 to their logical "0" states. Next, an analog read pulse is supplied by the store computer, and is used to confirm that the flip-flop 29 is in its logical "0" state. If it were in its logical "1" state, it would supply a current through resistor 30 and transistor 31. Most of the current passing through the transistor 31 would pass through the light emitting diode 21, the dissipation limiting resistor 32, the function separator 26, and the bus 20. By measuring the returning current, the store computer can determine the number of price display units having their flip-flops 29 in a logical "1" state. Since, in the example under consideration, a reset pulse was just received by all price display units, said number should be zero.

Next, the store computer transmits a pulse train of electrically coded information on the bus 19, such pulses consisting of logical "0's" and "1's", and said train comprising a number of pulses equal to the number, N, of bits in the static shift register 27. Said computer synchronously transmits a train of N clock pulses on the bus 20. Said clock pulses are separated by the function separator 26, blocked by the transmission gate 33, and transmitted by the transmission gate 34 to the static shift register 27 and, logically inverted, to the "and" gate 35. The first pulse in said pulse train on bus 19 is to be a logical "1". At the beginning of the $N^{th}$ clock pulse, this logical "1" will be shifted to the last stage of the static shift register 27, and applied to one input of the "and" gate 35. At the end of the $N^{th}$ clock pulse, a logical "1" will appear at the other input of "and" gate 35, and said "and" gate will produce a logical "1" output, setting flip-flop 28 to a logical "1". At this time, the parallel outputs of the static shift register 27 will be compared to the outputs of the parallel read-only memory 36 by the exclusive "nor" circuits 37. Each such "nor" circuit which has equal logical values applied to both of its inputs will produce a logical "1" output, which output will be applied to one of the inputs of the "and" circuit 38. Equality between all of the outputs of the static shift register 27 and the parallel read-only memory 36, which contains the internal address code, signifies that the price display unit has been externally addressed. If said unit has been thus externally addressed, all of the inputs to the "and" circuit 38 will be logical "1's", and the output of said "and" circuit will be a logical "1", setting the flip-flop 29 to a logical "1" value.

The store computer next transmits another pulse train of electrically coded information on the bus 19, said information including the price to be displayed. A synchronous train of clock pulses is transmitted on the bus 20. Said clock pulses are blocked by the transmission gate 34 and, if the price display unit under consideration has been addressed, are transmitted by the transmission gate 33. If the clock pulses are transmitted by the transmission gate 33 to the static shift register 39, said electrically coded information will be entered into the static shift register 39. If the price display unit has not been addressed, the information previously stored in the static shift register will remian unaltered.

At the end of the last said pulse train, another analog read pulse is transmitted by the store computer to confirm that one and only one price display unit has responded, and another reset pulse is then transmitted to reset the static shift register 27 and the flip-flops 28 and 29 to their logical "0" states.

The binary to alphanumeric converter 40 converts the output of the static shift register 39 to a form suitable for entry into the light emitting diode visible display 41, which displays the total price, unit price, and other information regarding the item or items whose price is to be displayed. The static shift register 39 provides means for retaining memory of information received from the store computer.

Although parallel outputs of the static shift register 39 are used in the version of the invention shown, it should be noted that a serial output could equally well be employed by multiplexing the display and recirculating the contents of the shift register 39. A similar alternative exists for the address shift register 27, if a shift register which reset to the address code rather than to zero were used.

All of the circuitry indicated by labeled symbols in FIG. 4, with the exception of the function separator 26, can be constructed using standard digital circuitry. One method of accomplishing the objectives of the function separator is shown in FIG. 5. Positive pulses at the input 42 pass through the diode 43, and resistor 44, causing transistors 45 and 46 to turn on. The resistor 47 provides enough positive feedback to improve the rise and fall times of the resultant output clock pulses and to provide noise immunity during switching, but not enough to cause latching. Resultant clock pulses are produced at the output 48. Negative analog read pulses pass through the diode 49 to the analog read output 50. Negative reset pulses, which are more negative than said analog read pulses, pass through the Zener diode 51 and resistor 52, turning on the transistor 53 and producing reset pulses at the output 54.

I claim:

1. A price display unit adapted to be attached to a merchandise supporting means having a plurality of conductors of a signal bus extending parallel to each other along at least a portion of its length, comprising, in combination: a housing; a plurality of electrical contact means extending from a rear side of said housing to engage said conductors at any selected one of a plurality of locations along the length of said supporting means; fastener means for fastening said housing at a selected position along the length of said supporting means; externally-sensible indicia carried on said housing to identify said display unit and its internal address alphanumeric display means attached to said housing and visible from outside said housing; storage means for controlling said alphanumeric display means; and control means responsive to a first pulse train occurring on said signal bus for controlling whether a second pulse train occurring on said signal bus will be stored in said storage means.

2. A sales establishment, comprising, in combination: shelf means having a plurality of groups of items stored at respective ones of a plurality of locations along said shelf means; a plurality of display units spaced along said shelf means at respective ones of said locations; signal bus means extending along said shelf means and connected to each of said display units in parallel each of said display units comprising an alphanumeric display means, display storage means for controlling said alphanumeric display means, and control means responsive to a first pulse train occurring on said signal bus means for controlling whether a second pulse train occurring on said signal bus means will be stored in said display storage means.

3. Apparatus according to claim 2 wherein said control means in each of said display units comprises means for providing a fixed address signal identifying its respective display unit, and switching means controlled by said address signal and said first pulse train for controlling whether said second pulse train will be stored in said display storage means.

4. Apparatus according to claim 2 wherein said control means is operative after receipt of said first pulse train to apply a signal to said signal bus means indicating that said second pulse train will be stored by said display storage means.

5. Apparatus according to claim 2 wherein said control means includes a shift register connected to receive said first pulse train, means for providing an address signal identifying said display unit, a coincidence circuit means, means for comparing signals of said first pulse train stored in said shift register to provide a plurality of output signals to said coincidence circuit means, said signal bus means including means for applying shift pulses to advance the signals of said first pulse train through said shift register, and means responsive to the shifting of a first pulse of said first pulse train out of said shift register for applying a further signal to said coincidence circuit means.

6. Apparatus according to claim 3 wherein said display storage means comprises a shift register having a data input line and a shift input line, said data input line being connected to receive said second pulse train, and said switching means being operative to control whether clock pulses transmitted on said signal bus means will be connected to said shift input line, thereby to control whether said second pulse train will be stored in said shift register.

7. Apparatus according to claim 3 wherein said switching means includes a first plurality of gates responsive to said address signal and said first pulse train to provide a plurality of output signals, and coincidence circuit means responsive to said output signals for controlling storage of said second pulse train in said display storage means.

8. In a sales establishment having a plurality of types of items to be sold stored at a plurality of locations, a point-of-sale terminal, and a memory means, said terminal including means for sensing a respective product code carried on each item of each type of said plurality of types of items, interrogating said memory means to obtain data stored in said memory means for each sensed product code, and means for totalizing data obtained from the sensing of a plurality of said product codes, the combination of: a plurality of display units located at respective ones of said locations to be associated with respective ones of said types of items; a signal bus means extending from said memory means to each of said display units; each of said display units carrying coded externally-sensible indicia identifying said display unit and its fixed internal address; and a portable reader means for sensing the coded indicia of each display unit and the product code of the type of such items associated with said display unit and transmitting signals representing said coded indicia and product code to said memory means.

9. The combination according to claim 8 wherein each of said display units includes visible display means, storage means, means for providing a respective address signal, and comparing means, and said memory means is operative to transmit first and second pulse trains over said signal bus means to each of said display units, the comparing means of each of said display units being operative to compare the first pulse train with its respective address signal and to store the second pulse train of a given pair of pulse trains in the said storage means of the display unit having an address corresponding to said first pulse train, the visible display means of each of said display units being connected to display alphanumeric indicia corresponding to the signals stored in the respective storage means of said display unit.

10. The combination according to claim 8 wherein said establishment includes a shelf having said plurality of locations and said signal bus means comprises a plurality of substantially parallel electrical conductors along said shelf.

11. A price display unit adapted to be attached to a shelf means to engage a plurality of conductors extending along said shelf means, comprising, in combination: a first shift register having a data input line and a clock input line, said data input line being connected to a first of said conductors; means connected to and responsive to a first signal on a second of said conductors for applying subsequent signals on said second of said conductors to said clock input line; means responsive to a predetermined number of said subsequent signals for interrupting the application of further signals on said second of said conductors to said clock input line and for providing a first control signal; means controlled by said first control signal for providing a second control signal if the contents of said first shift register has a predetermined value upon occurrence of said first control signal; a second shift register having a data input line and a clock input line, said data input line of said second shift register being connected to said first of said conductors; means responsive to said second control signal for connecting signals on said second of said conductors to said clock input line of said second shift register; an electronically-controlled alphanumeric display means; and decoder means for decoding the contents of said second shift register to control said display means.

12. A unit according to claim 11 which includes means responsive to said second control signal for applying a signal to said second of said conductors and for actuating an indicator.

* * * * *

UNITED STATES PATENT OFFICE
CERTIFICATE OF CORRECTION

Patent No. 4,002,886                     Dated January 11, 1977

Inventor(s) Ronald Murl Sundelin                     Page 1 of 2

It is certified that error appears in the above-identified patent and that said Letters Patent are hereby corrected as shown below:

Column 1, line 44, "printed price displasys" should read -- printed price displays --.

Column 3, line 26, "13, and the product code 14 of the items or items" should read -- 13, and the product code 14 of the item or items --.

Column 3, line 50, "four conductors is preferale for reasons of reliability" should read -- four conductors is preferable for reasons of reliability --.

Column 4, line 51, both occurrences of "1" should be set in normal type.

Column 5, line 11, "stored in the static shift register will remian unaltered" should read -- stored in the static shift register will remain unaltered --.

Column 5, line 63, "ing to identify said display unit and its internal address" should read -- ing to identify said display unit and its internal address --

Column 6, line 9, "connected to each of said display units in parallel each" should read -- connected to each of said display units in parallel, each --.

UNITED STATES PATENT OFFICE
CERTIFICATE OF CORRECTION

Patent No. 4,002,886     Dated January 11, 1977

Inventor(s) Ronald Murl Sundelin     Page 2 of 2

It is certified that error appears in the above-identified patent and that said Letters Patent are hereby corrected as shown below:

Column 6, line 20, "its respective display unit, and switching means con-" should read
-- its respective display unit; and switching means con --.

Column 7, line 31, "along said shelf." should read
-- extending along said shelf. --.

*Signed and Sealed this*

Twelfth *Day of* April 1977

[SEAL]

*Attest:*

RUTH C. MASON
*Attesting Officer*

C. MARSHALL DANN
*Commissioner of Patents and Trademarks*